(12) United States Patent
Pezzuto et al.

(10) Patent No.: US 6,748,978 B2
(45) Date of Patent: Jun. 15, 2004

(54) MICROFLUIDIC DEVICES WITH POROUS REGIONS

(75) Inventors: Marci Pezzuto, Altadena, CA (US); Stephen D. O'Connor, Pasadena, CA (US)

(73) Assignee: Nanostream, Inc., Pasadena, CA (US)

( * ) Notice: Subject to any disclaimer, the term of this patent is extended or adjusted under 35 U.S.C. 154(b) by 0 days.

(21) Appl. No.: 10/188,285

(22) Filed: Jul. 1, 2002

(65) Prior Publication Data

US 2003/0005969 A1 Jan. 9, 2003

Related U.S. Application Data

(63) Continuation of application No. 09/839,547, filed on Apr. 20, 2001, now Pat. No. 6,418,968.

(51) Int. Cl.[7] ............................................. F16K 27/00
(52) U.S. Cl. ........................ 137/833; 204/601; 422/100
(58) Field of Search ........................ 137/833; 204/601; 422/100

(56) References Cited

U.S. PATENT DOCUMENTS

| | | | |
|---|---|---|---|
| 3,568,692 A | 3/1971 | Metzger et al. ............ 137/81.5 |
| 3,680,576 A | 8/1972 | Kiwak ........................ 137/833 |
| 3,783,902 A | 1/1974 | Schwarz et al. ............ 137/803 |
| 4,676,274 A | 6/1987 | Brown ....................... 137/806 |
| 5,800,785 A | 9/1998 | Bochner ..................... 422/101 |
| 5,879,632 A | * 3/1999 | Demers ...................... 422/100 |
| 5,922,591 A | 7/1999 | Anderson et al. ......... 435/287.2 |
| 6,043,080 A | 3/2000 | Lipshutz et al. ......... 435/287.2 |
| 6,074,725 A | 6/2000 | Kennedy .................... 428/188 |
| 6,210,986 B1 | 4/2001 | Arnold et al. ................ 438/42 |
| 6,274,726 B1 | 8/2001 | Laugharn, Jr. et al. .... 536/25.4 |
| 6,296,020 B1 | 10/2001 | McNeely et al. ........... 137/806 |
| 6,352,577 B1 | 3/2002 | Martin et al. .................... 96/4 |
| 6,432,290 B1 | 8/2002 | Harrison et al. ............ 204/453 |
| 6,494,614 B1 | 12/2002 | Bennett et al. ............. 366/336 |
| 6,533,840 B2 | 3/2003 | Martin et al. ................... 95/45 |
| 2002/0094533 A1 | 7/2002 | Hess et al. ...................... 435/6 |
| 2002/0189947 A1 | 12/2002 | Paul et al. .................. 204/461 |
| 2002/0194909 A1 | 12/2002 | Hasselbrink et al. .......... 73/253 |

FOREIGN PATENT DOCUMENTS

| | | | |
|---|---|---|---|
| DE | 197 39 722 | 9/1997 | ............ H05K/3/36 |
| WO | WO 98/04909 | 2/1998 | |
| WO | WO 99/19717 | 4/1999 | .......... G01N/25/22 |
| WO | WO 99/60397 | 11/1999 | ......... G01N/33/483 |
| WO | WO 01/07506 | 2/2001 | ............. C08J/5/00 |
| WO | WO 01/09598 | 2/2001 | .......... G01N/27/26 |
| WO | WO 01/38865 | 5/2001 | |

OTHER PUBLICATIONS

Khandurina, Julia, et al., "Microfabricated Porous Membrane Structure for Sample Concentration and Electrophoretic Analysis," Analytical Chemistry, vol. 71, No. 9, pp. 1815–1819, May 1, 1999.

(List continued on next page.)

Primary Examiner—A. Michael Chambers
(74) Attorney, Agent, or Firm—Vincent K. Gustafson; Michael F. Labbee

(57) ABSTRACT

Microfluidic devices having porous materials that restrict fluid flow rate for a given pressure are provided. Multiple porous regions can be constructed in a single device so that they have different valving capabilities or impedances, and in unison can control the overall direction of fluid flow. Porous regions can be constructed in various ways, such as, for example: by inserting porous materials into or between channels; by sandwiching one or more sheets or layers of porous materials between other layers of a device; or by inserting a liquid, solution, slurry, or suspension into a microfluidic channel and then permitting the formation of porous deposits by promoting at least partial evaporation. Adhesive tape may be used for one or more layers of such a microfluidic device.

11 Claims, 7 Drawing Sheets

OTHER PUBLICATIONS

Merkel, Tobias, et al., "A New Technology for Fluidic Microsystems Based on PCB Technology," Sensors and Actuators 77, pp.98–105, 1999.

Shediac, Renée, et al., *Reversed–phase electrochromatography of amino acids and peptides using porous polymer monoliths*, "Jounral of Chromatography," A 925, (2001), pp. 251–263.

Jian, Yun, et al., *Integrated Plastic Microfluidic Devices with ESI–MS for Drug Screening and Residue Analysis*, "Analytical Chemistry," vol. 73, No. 9, May 1, 2001, pp. 2048–2053.

* cited by examiner

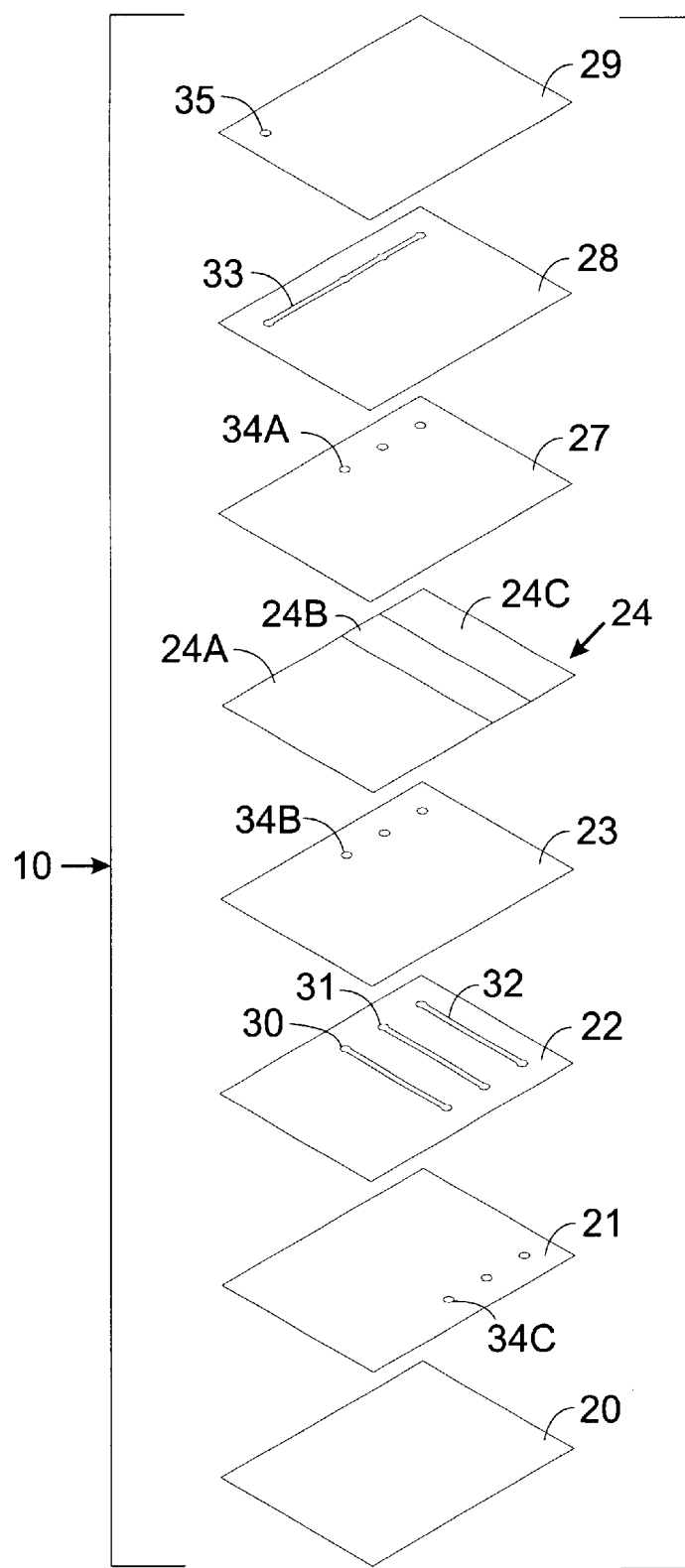
FIG. _1A

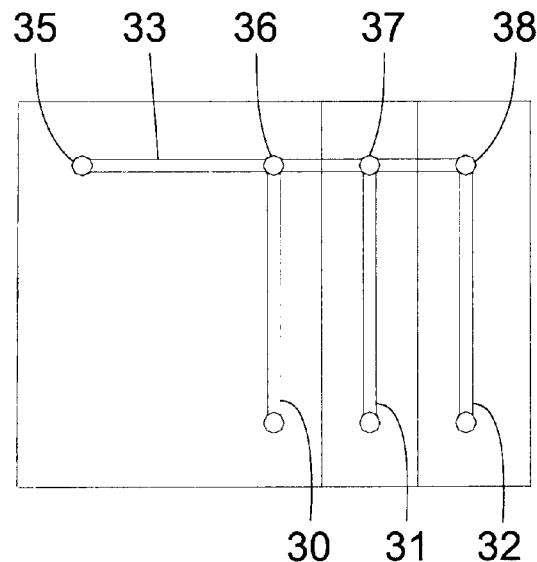
FIG. _1B
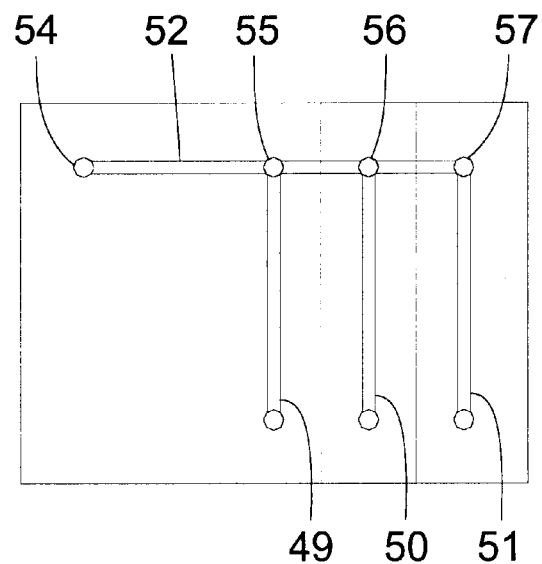
FIG. _2B

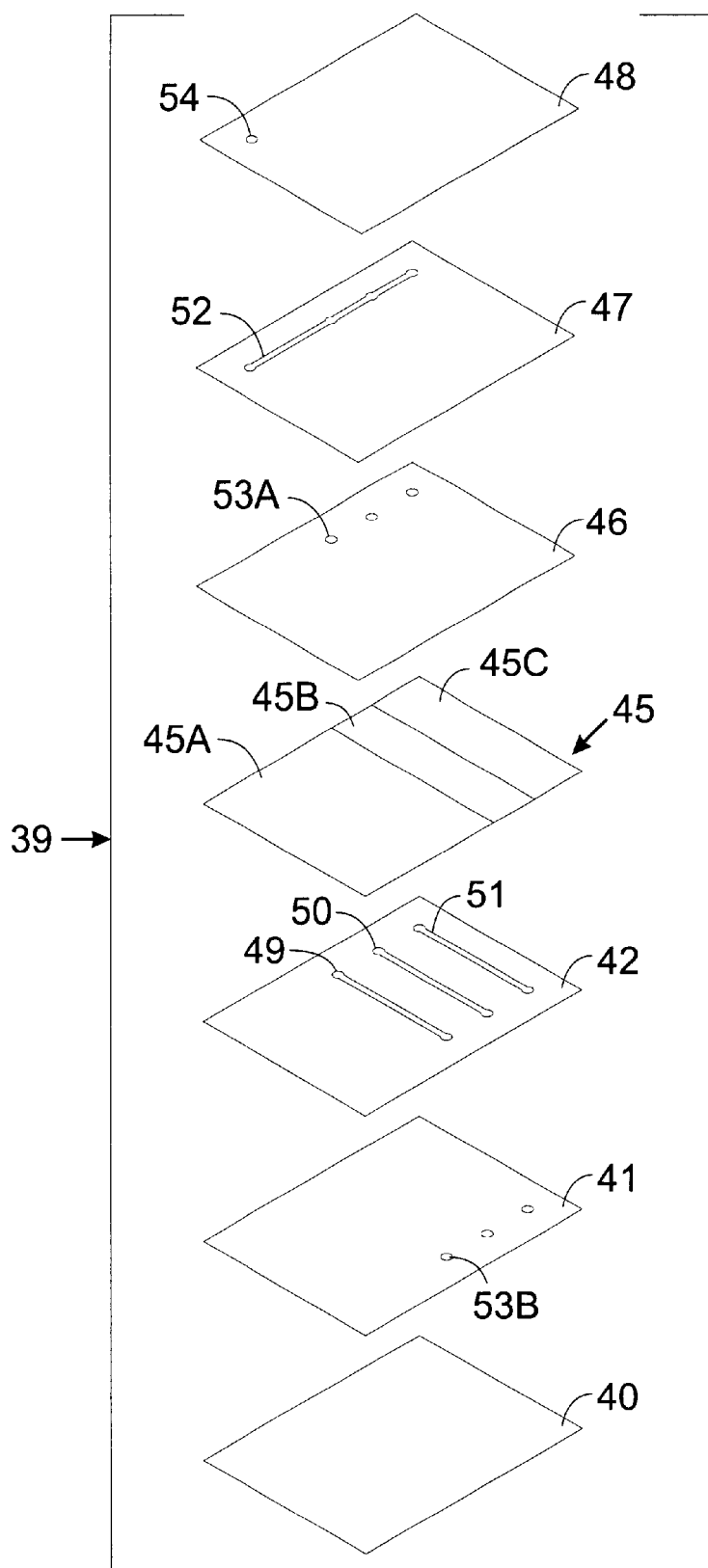
FIG. _2A

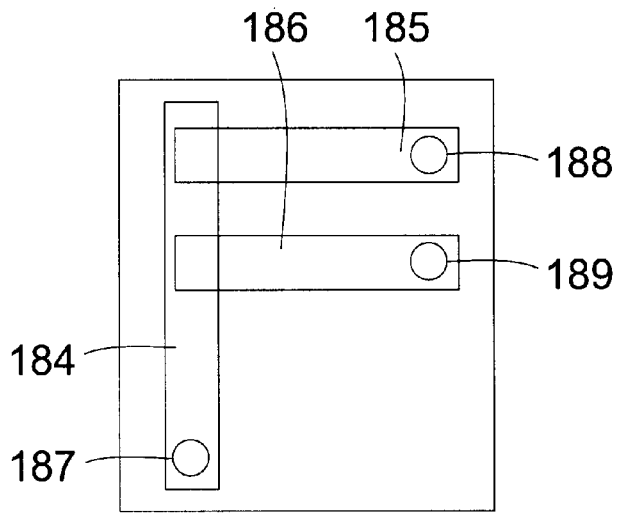
FIG. _3B
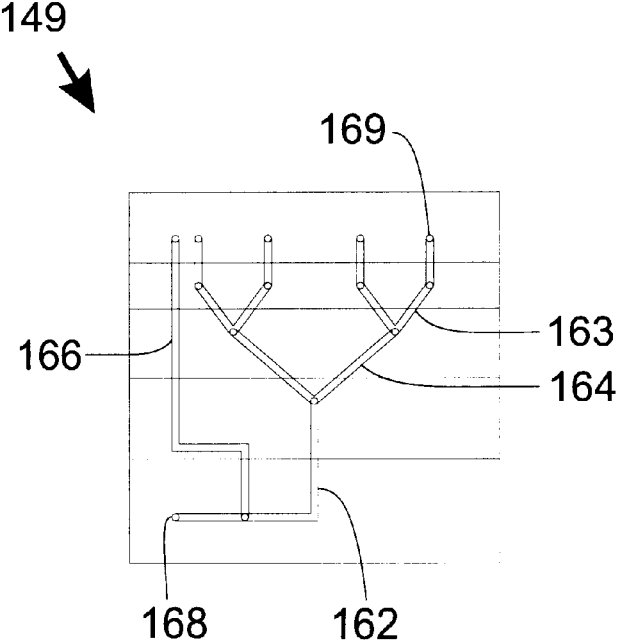
FIG. _4B

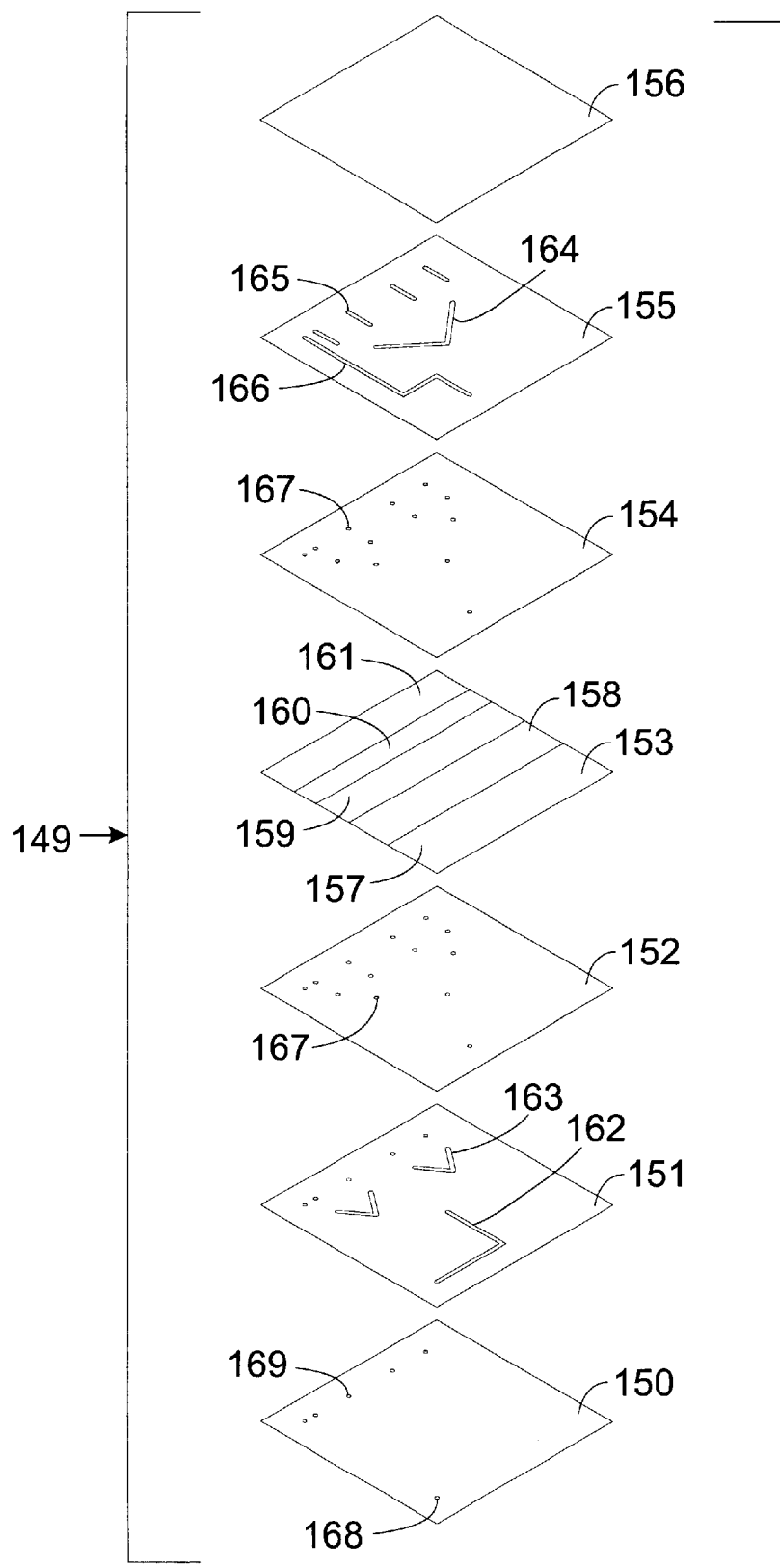
FIG. _4A

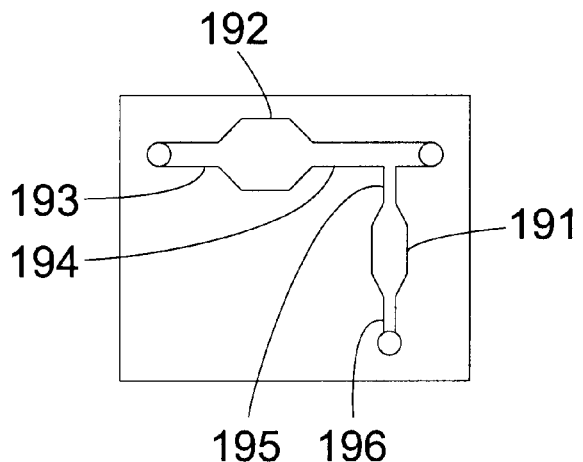
FIG. _5A
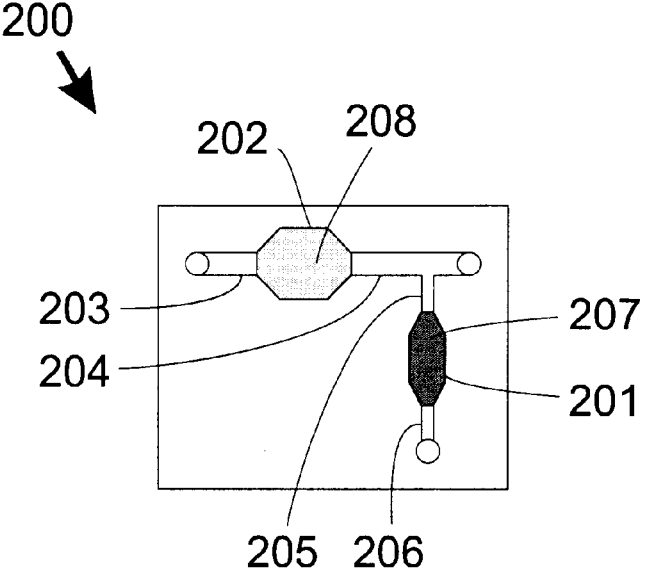
FIG. _5B

MICROFLUIDIC DEVICES WITH POROUS REGIONS

STATEMENT OF RELATED APPLICATION(S)

This application is a continuation of U.S. application Ser. No. 09/839,547, filed Apr. 20, 2001, now U.S. Pat. No. 6,418,968, issued Jul. 16, 2002.

FIELD OF THE INVENTION

The present invention relates to microfluidic devices having integral porous regions.

SUMMARY OF THE INVENTION

This invention relates to the microfluidic devices that contain built-in means for controlling fluid flow. In one aspect of the present invention, certain sections of microfluidic channels contain porous materials that inhibit fluid flow. These sections are referred to herein as porous regions. In use, when fluid encounters these regions, fluid flow will be inhibited until sufficient pressure is provided for the fluid to overcome the impedance provided by the porous materials.

In certain embodiments, these microfluidic device comprise sandwiched stencils as in U.S. patent application Ser. No. 09/453,029, filed Dec. 2, 1999, now abandoned; and as in the substantially identical WIPO published application number WO 01/25138, filed Oct. 4, 2000, published Apr. 12, 2001, and now abandoned. The impedance regions can be constructed within the channels in a number of ways. In a preferred embodiment, porous materials are inserted into or between channels to form the impedance region. In another preferred embodiment, the impedance region is a sheet or layer of material that forms one of the stencil layers of the device. Fluid travels through channels in one layer of a device and passes through vias (apertures between layers) that lead through the stencil layer composing the impedance region to channels on an upper or lower layer of the device. In other embodiments, an impedance region may be constructed by inserting or flowing one or more ingredients into a channel and allowing the ingredients to partially or fully solidify, such as by partial or complete evaporation. The flowing ingredient(s) from which the impedance region is constructed may be a liquid, slurry, or suspension of polymers, inorganic materials, or other materials known in the filtering art.

Multiple porous regions described here can be built into a single microfluidic device. The porous regions can have similar or very different impedances, depending on numerous factors including the composition of the materials or geometry used to construct the porous regions.

BRIEF DESCRIPTION OF THE DRAWINGS

FIG. 1A shows an exploded view of a first microfluidic device having three porous regions. FIG. 1B shows a top view of the device of FIG. 1A.

FIG. 2A shows an exploded view of a second microfluidic device having three porous regions. FIG. 2B shows a top view of the device of FIG. 2A.

FIG. 3B shows a top view of the assembled device of FIG. 3A.

FIG. 4A shows an exploded view of a microfluidic device according to the present invention that meters a sample and splits it into four equal portions using porous regions. FIG. 4B shows a top view of the assembled device of FIG. 4A.

FIG. 5A shows a top view of a microfluidic device including two empty chambers. FIG. 5B shows a top view of a microfluidic device including two chambers each having a porous membrane.

DETAILED DESCRIPTION OF PREFERRED EMBODIMENTS OF THE INVENTION

Definitions

Figure 3A:
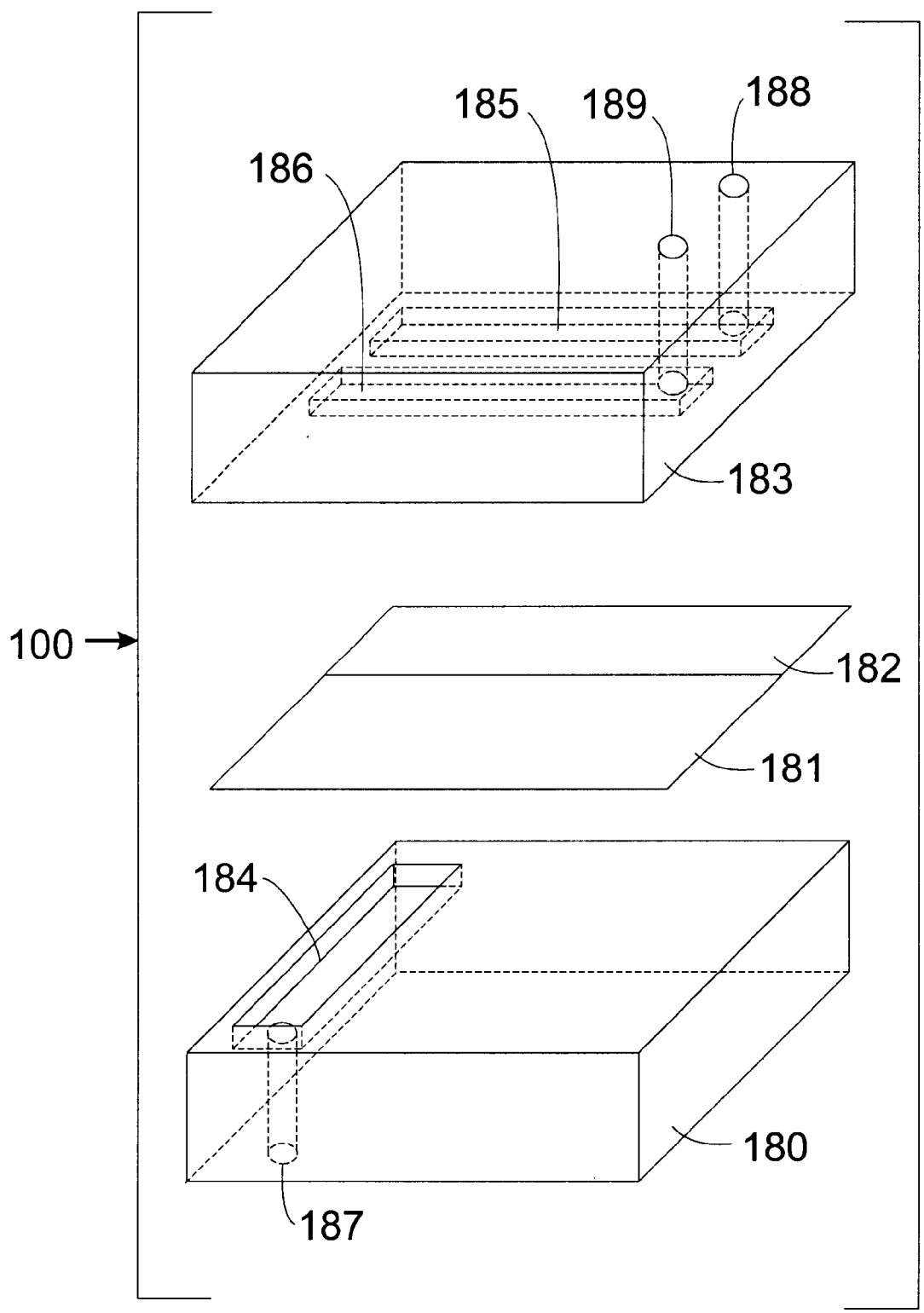
FIG. 3A shows an exploded perspective view of a third microfluidic device having two porous regions.

The term "channel" as used herein is to be interpreted in a broad sense. Thus, it is not intended to be restricted to elongated configurations where the transverse or longitudinal dimension greatly exceeds the diameter or cross-sectional dimension. Rather, such terms are meant to comprise cavities or tunnels of any desired shape or configuration through which liquids may be directed. Such a fluid cavity may, for example, comprise a flow-through cell where fluid is to be continually passed or, alternatively, a chamber for holding a specified, discrete amount of fluid for a specified amount of time. "Channels" may be filled or may contain internal structures comprising valves or equivalent components.

The term "microfluidic" as used herein is to be understood, without any restriction thereto, to refer to structures or devices through which fluid(s) are capable of being passed or directed, wherein one or more of the dimensions is less than 500 microns.

The term "porous regions" as used herein describes a portion of, or an interface with, a microfluidic channel or element that restricts fluid flow rate for a given pressure using a porous material. A restriction of flow rate for a particular pressure may also be called an impedance. An incredibly wide variety of materials may be used to create a porous region, as would be recognized by one skilled in the art of filtering. Factors that may affect the impedance caused by a particular porous region include, but are not limited to, the following: porous region dimensions; network geometry between a porous region and associated inlet or outlet channels; pore size/void volume; pore geometry (for example, if pores are randomly dispersed or aligned with the direction of fluid flow); and the particular material used, including any chemical interaction between the porous material and a working fluid (for example, if the porous region is composed of hydrophobic material and an aqueous solution flows in the device).

This invention relates to the microfluidic devices that contain built-in means for controlling fluid flow. In one aspect of the present invention, certain sections of the microfluidic channels contain porous materials that inhibit fluid flow. In use, when fluid encounters these regions, fluid flow will be inhibited until sufficient pressure is provided for the fluid to overcome the impedance provided by the porous materials. Multiple porous regions can be provided in a single microfluidic device so that they have different valving capabilities or impedances, and in unison can control the overall direction of fluid flow.

In certain embodiments, these microfluidic devices comprise sandwiched stencils as in U.S. patent application Ser. No. 09/453,029, filed Dec. 2, 1999, now abandoned; and as in the substantially identical WIPO published application number WO 01/25138, filed Oct. 4, 2000, published Apr. 12, 2001, and now abandoned, which is are incorporated herein by reference. The impedance regions can be constructed within the channels in a number of ways. In preferred embodiment, porous materials are inserted in or between the channels and form the impedance region. These porous materials are constructed such that a pressure drop occurs from one side of the material to the other and inhibits, but does not block, fluid flow within a desired pressure range. In another preferred embodiment, the impedance region is a sheet or layer of material that forms one of the stencil layers of the device. Fluid travels through channels in one layer of a device and passes through vias that lead through the stencil layer composing the impedance region to channels on an upper or lower layer of the device. In other embodiments, an impedance region may be constructed by inserting or flowing one or more fluidic ingredients into a channel and allowing the ingredients to partly or fully solidify. The fluidic ingredient(s) from which the impedance region is constructed may be a liquid, solution, slurry, or suspension of polymers, ceramics, or other materials, including inorganic materials.

In certain embodiments of the invention, porous membranes are used to direct and control fluid flow within a microfluidic device. Porous membranes may be characterized by several properties, such as pore size, chemical interaction with a working fluid (for example, hydrophobicity or hydrophillicity with regard to aqueous solutions), and void volume, that determine the fluid intrusion pressures and flow through rates of a particular membrane. These characteristics can be utilized within a microfluidic device to manipulate the fluid in a desired way.

Various hydrophobic membranes are manufactured with various fluid intrusion pressures. In one embodiment, several membranes with different fluid intrusion pressures can be configured within a microfluidic device to create valves of various impedances.

In another preferred embodiment, material can be packed inside a channel or via to provide the valving mechanism. Various filter materials are available for this purpose, including silica gel, polymeric beads, glass beads, and other materials used in chromatography. Other equivalent materials are commonly known in the filtering art.

In use, pressure or other means cause fluid to flow through a channel. When the fluid front reaches a region containing a porous material, the fluid flow is inhibited from passing the porous region until the impedance caused by the material is overcome by an increased pressure within the channel. In certain embodiments, the fluid does begin to flow into the porous material, but flows slowly. The fluid flow rate through the material will generally be proportional to the backpressure.

As noted above, many factors can affect the profile of fluid flow rate versus backpressure for flow through a given porous material. These factors include, but are not limited to, the chemical nature of the material, pore size of the material, geometry and shape of the pores in the material, amount of surface area of the material, size of the opening through which fluid may flow, and other parameters. The nature of the fluid that is flowed will also have an effect. Fluid factors include but are not limited to composition of the fluid, surface tension of the fluid, viscosity of the fluid, temperature, and compressibility of the fluid.

Devices according to the present invention can be constructed in a variety of ways. A few examples are shown.

Referring to FIG. 1A, a microfluidic device 10 is constructed from eight device layers 20–24, 27–29 (including multiple stencil layers such as stencils 22, 28), from which channels 30–33, vias 34A–34C, and an inlet aperture 35 have been removed. Three different porous membranes 24A–24C comprise the fifth device layer 24. The first porous region 24A is composed of 40-micron pore size ultra high molecular weight polyethylene (UHMWPE), which is hydrophobic. The second porous region 24 is composed of 25-micron pore size UHMWPE. The third porous region 25 is composed of 2.5–4.5 micron pore size UHMWPE. The bottom device layer 20 is also a porous material and composed of 1–2 micron pore size PTFE. Device layers 21, 23, 27 are fabricated with single-sided tape having a 2 mil polyester carrier with 0.8 mil acrylic adhesive. Stencil layers 22, 28 are double-sided tape composed of 0.5 mil thick polyester carrier with 1.8 mil thickness acrylic adhesive on both sides. The top device layer 29 is a 0.125 inch thickness polycarbonate base with a 0.38 inch diameter hole drilled to form an inlet port 35.

The assembled device 10 is shown in FIG. 1B and the three valve regions 36–38 are shown. In use, colored water was injected at the inlet port 35 at a flow rate of 10 microliters per minute. The fluid filled the channel 33 completely and stopped at each of the valve regions 36–38. Then, further pressure was applied to the inlet port 35 until the first valve 36 was overcome. The first valve 36 includes the combination of the first porous material 24A and associated vias 34A, 34B. The first valve 36 was overcome first because the first porous material 24A (40-micron pore size) passes water more easily than do the other porous materials 24B, 24C. When the water filled channel 30 downstream of the first valve 36, the fluid front encountered the porous material that composed the bottom layer 20. The porous bottom layer 20 provides even more resistance to fluid flow than the second valve 37, so the second valve 37 was overcome next. In a like manner, once channel 31 was filled, then third valve 38 was overcome.

Another microfluidic device 39 with built-in valving is shown in FIGS. 2A–2B. This device 39 is similar to the device 10 shown in FIGS. 1A–1B, except the porous membranes 45A–45C actually form (i.e., bound) one surface of the channels 49–51. Referring to FIG. 2A, a microfluidic device is constructed from seven device layers 40–42, 45–48 (including multiple stencil layers 42, 47) from which channels 49–52, vias 53A–53B, and an inlet aperture 54 have been removed. Three different porous membranes 45A–45C comprise the fourth device layer 45. The first porous region 45A is composed of 40-micron pore size ultra high molecular weight polyethylene (UHMWPE), which is hydrophobic. The second porous region 45B is composed of UHMWPE with 25-micron pore size. The third porous region 45C is composed of 2.5–4.5 micron pore size UHMWPE. The bottom device layer 40 is also a porous material and composed of 1–2 micron pore size PTFE. Device layers 41 and 46 are composed of single-sided tape having a 2 mil thickness polyester carrier with 0.8 mil acrylic adhesive. Stencil layers 42 and 47 are double-sided tape composed of 0.5 mil thick polyester carrier with 1.8 mil thick acrylic adhesive on both sides. The top device layer 48 is a 0.125 inch thickness polycarbonate base with a 0.38 inch diameter aperture drilled to form an inlet port 35.

The assembled device 39 is shown in FIG. 2B. The device functioned identically to the device 10 shown in FIGS. 1A–1B.

In certain occasions, it may be preferable to fashion each device layer from a single material. A device such as this can be constructed by forming vias in the porous materials themselves and having entire sheets of the porous material forming individual layers.

The invention can also be practiced using traditional microfluidic construction techniques such as etching channels in glass or silicon or embossing channels in polymeric materials. Referring to FIG. 3A, a microfluidic device 100 is composed of four parts 180–183, two parts made by defining recessed channels 184–186 in substrates 180,183, and two parts that are porous materials 181,182. The bottom substrate 180 defines a channel 184 that has been recessed by techniques such as, e.g., etching or embossing. Also, a via 187 has been created all the way through the substrate 180. This via 187 can be produced, for example, by a secondary etch or by drilling. A top plate 183 is constructed with two recessed channels 185, 186 and two vias 188, 189. Two different porous areas 181, 182 are sandwiched between the recessed portions of the substrate 180, 183. In this example, the porous areas 181, 182 are made of identical materials but hay different pore sizes. For example, porous area 182 is 5-micron pore size and member 181 is 25-micron pore size. The porous areas 181, 182 preferably, but do not necessarily, occupy a common layer. The substrates 180, 183 may be bonded to the porous members 181, 182 in a variety of ways. For example, a layer of adhesive can be applied to the top layer of the bottom substrate 180 and to the bottom layer of the top substrate 183 and the device 100 sandwiched together. Other bonding methods, as discussed in U.S. patent application Ser. No. 09/453,029 filed Dec. 2, 1999, now abandoned; and as in the substantially identical WIPO published application number WO 01/25138, filed Oct. 4, 2000, published Apr. 1, 2001, and now abandoned (which are incorporated herein by reference in its entirety), may be employed. Such methods include, but are not limited to, ultrasonic welding and thermal treatment.

The assembled device 100 is shown in FIG. 3B. In use, fluid is injected at port 187 and passes through channel 184. During the filling of the channel 184, fluid does not enter channels 185 or 186 until channel 184 is completely full, due to the excess pressure required to overcome the filter area 181,182. Once the channel 184 is completely filled, fluid passes through filter area 181 first, due to the larger pore size and thus smaller pressure drop required, and fills channel 186. If exit 189 is blocked, then pressure will build up and the fluid will pass through filter 182 and fill channel 185.

In another embodiment, porous regions can be used in a device to create a microfluidic metering system. Referring to FIG. 4A, an exploded view is shown of a microfluidic device 149 that was constructed from seven device layers 150–156 including multiple stencil layers 151,155. Defined in the device layers 150–156 are microfluidic channels 162–166, vias 167, an entry port 168, and exit ports 169. The central layer 153 is constructed from five different porous materials 157–161. Porous region 157 is 40-micron pore size UHMWPE; region 158 is 30-micron pore size UHMWPE; region 159 is 20-micron pore size UHMWPE; region 160 is 10-micron pore size UHMWPE; and region 161 is 1-micron pore size UHMWPE. Device layers 152,154 are constructed from single-sided adhesive tape with the adhesive facing stencil 153. Stencil layers 151,155 are constructed with double-sided adhesive tape, and device layers 150 and 156 are polymeric films with no adhesive. For examples of the materials that can be used, see U.S. patent application Ser. No. 09/453,029. The assembled device 149 is shown in FIG. 4B. In use, a small portion of fluid is injected at the entry port 168 and passes down channel 162 until it reaches the end of the channel 162. The portion of fluid should be large enough to fill the metering portion of channel 162, but not greater than the total volume of channels 162 and 166. The excess fluid then passes through the first porous membrane region 157 into waste channel 166 since the pressure drop across first membrane region 157 is the weakest of the five porous regions 157–161. Air is injected behind the fluid to drive the flow. Once the waste fluid reaches the end of channel 166, the fluid in channel 162 passes through the second porous membrane region 158, since the pressure drop across the second region 158 is weaker than the drop across the fifth region 161 at the exit of the channel 166. The plug of fluid passes through the third porous membrane region 158 and then is split equally in two channels 164. The volume of each channel 164 is exactly one-half the volume of the metering portion of channel 162. Once channel 164 is filled, the two plugs of fluid pass through the third porous region 159 and enter into channels 163. Each channel 163 is exactly one-quarter of the volume of channel 162. Once each channel 163 is filled, the fluid passes through the fourth porous membrane region 160 and goes to the exit ports 169. In summary, this device 149 takes an uncertain volume of fluid, meters off a known amount, and splits that sample into four equal portions for further analysis. The porous regions control the path taken by fluid within the device 149.

In a preferred embodiment, different porous membranes can be used to control the flow rate (and therefore total volume) within a given channel. At a given backpressure, membranes of different porosities and void volumes will have different flow-through rates.

In another embodiment, porous regions may be constructed within the same layer as their associated inlet and outlet channels. Referring to FIG. 5A, a microfluidic device 190 includes two empty chambers 191,192 defined in a common layer with fluid channels 193–196. The device 190 is preferably constructed from multiple layers of material, with the chambers 191, 192 and channels 193–196 formed in a stencil layer sandwiched between other device layers. FIG. 5B shows a microfluidic device 193 having chambers 201, 202 and channels 203–206 similar to those provided in FIG. 5A, but with the addition of porous regions 207, 208 to the chambers 201, 202. The porous regions 207, 208 may be added to the chambers 201, 202 according to various methods, including, but not limited to, the following: silk screening (as discussed in U.S. application Ser. No. 09/453,029), placing or packing porous elements in place, or flowing ingredients into the chamber 201, 202 and allowing the ingredients to partially or fully solidify. Flowing ingredients from which the impedance region is constructed may include liquids, slurries, or suspensions of materials including polymers, inorganic materials, or other materials known in the filtering art. For example, a suspension of glass beads in liquid such as an alcohol may be introduced into chambers 201, 202 during fabrication, and then the liquid may be evaporated, in part or in full, prior to sealing the device 200. Following evaporation, the glass beads remain in the respective chambers 201, 202 to form a porous membrane. If desired, beads of different sizes or materials may be used for membranes 207, 208 to provide substantially different impedances. If solid membranes are placed in and used with chambers 201, 202, then a wide variety of filter materials may be used, as would be appreciated by one skilled in the art. Very similar or substantially different filter materials may be used to form the various membrane valves that may be present in a particular device, such as the device 200 shown in FIG. 5B.

Surprisingly, it has been observed that the use of the same filter material for two porous regions in a single device still tends to result in the regions having different impedances. That is, when fluid injected into a microfluidic device is in simultaneous communication with multiple porous regions—each located along the same channel, each fabricated from the same material, and each fabricated in the same geometry and according to the same method—one region always appears to "break" or permit the passage of fluid before the other(s). However, in such a situation it is impossible to predict which region will break first. When it is desirable to facilitate predictable flow of fluid within a microfluidic device having multiple porous regions, preferably the impedance of each porous region in fluid communication with a particular channel is intentionally constructed to be distinct from the other(s), such as, for example, by different region geometry or dimensions, different interface geometry, different pore size, and/or different materials.

As would be appreciated by one skilled in the art, additional factors that may affect the flow within microfluidic devices incorporating porous regions according to the present invention include, but are not limited to: materials used to fabricate the devices; geometry of the channels and interfaces between channels, including shapes and sizes of openings between and into channels; geometry of channel and filter interfaces; and the type, nature and physical properties of the working fluid(s) used, including surface tension effects of fluids, such as with the addition of soap; temperature; and pressure.

The particular porous regions, device configurations, and construction methods illustrated and described herein are provided by way of example only, and are not intended to limit the scope of the invention. The scope of the invention should be restricted only in accordance with the appended claims and their equivalents.

What is claimed is:

1. A multi-layer microfluidic device comprising:
   a first device layer defining a first microfluidic channel;
   a second device layer defining a second microfluidic channel and a third microfluidic channel;
   a first porous region in fluid communication with both the first microfluidic channel and the second microfluidic channel; and
   a second porous region in fluid communication with both the first microfluidic channel and the third microfluidic channel;
   wherein each porous region has a characteristic fluidic impedance, and the impedance of the first porous region differs from the impedance of the second porous region.

2. The microfluidic device of claim 1 wherein any of the first device layer and the second device layer is a stencil layer.

3. The microfluidic device of claim 1, further comprising a third device layer disposed between the first device layer and the second device layer, wherein the third device layer includes any of the first porous region and the second porous region.

4. The microfluidic device of claim 3 wherein the third device layer comprises a porous membrane.

5. The microfluidic device of claim 1 wherein at least one porous region is constructed by inserting into any of the second microfluidic channel and the third microfluidic channel an ingredient selected from the group consisting of a liquid, a solution, a slurry, and a suspension, and then permitting at least partial evaporation of the ingredient.

6. A multi-layer microfluidic device comprising a plurality of device layers defining:
   a first microfluidic channel, a second microfluidic channel, and a third microfluidic channel, wherein at least the first microfluidic channel and the second microfluidic channel are defined in different device layers;
   a first porous material disposed between the first microfluidic channel and the second microfluidic channel; and
   a second porous material disposed between the second microfluidic channel and the third microfluidic channel;
   wherein each porous material has a characteristic fluidic impedance, and the impedance of the first porous material differs from the impedance of the second porous material.

7. The microfluidic device of claim 6 wherein any device layer of the plurality of device layers is a stencil layer.

8. The microfluidic device of claim 6 wherein the first porous material and the second porous material are substantially contiguous.

9. A multi-layer microfluidic device comprising a plurality of device layers defining:
   a first microfluidic channel;
   a second microfluidic channel;
   a third microfluidic channel; and
   a porous layer defining a first porous region having a first porosity and defining a second porous region having a second porosity, the first porosity being different from the second porosity;
   wherein at least the first microfluidic channel and the second microfluidic channel are defined in different device layers, and the first porous region is disposed between the first microfluidic channel and the second microfluidic channel.

10. The device of claim 9 wherein the second porous region is disposed between the first microfluidic channel and the third microfluidic channel.

11. The device of claim 9 wherein the second porous region is disposed between the second microfluidic channel and the third microfluidic channel.

* * * * *